(No Model.) 2 Sheets—Sheet 2.
H. G. LEA.
ROAD CART.
No. 411,863. Patented Oct. 1, 1889.
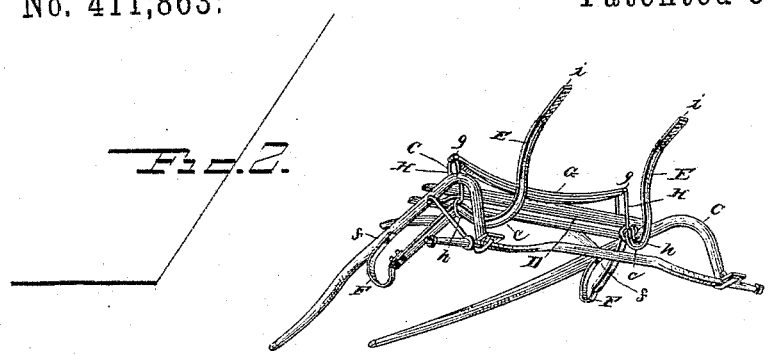
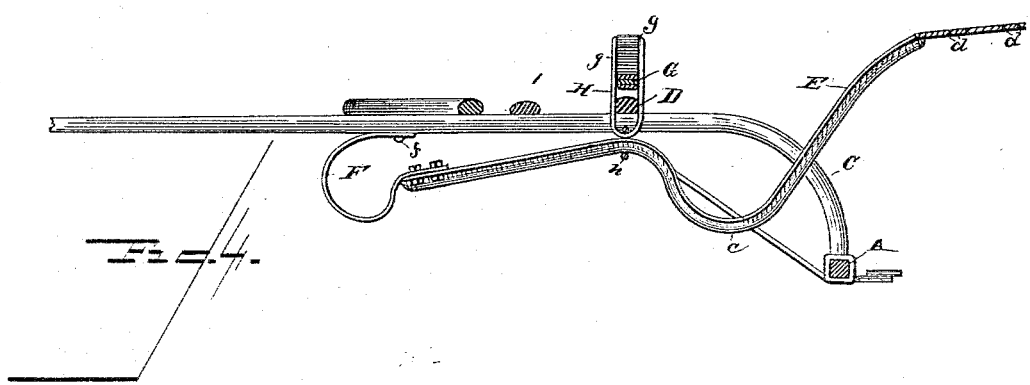
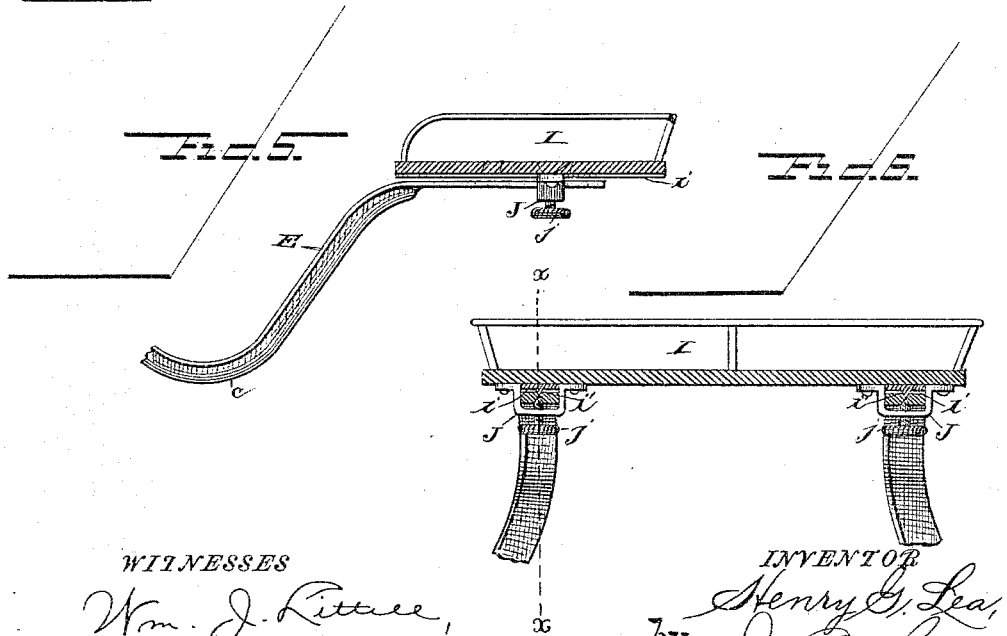
WITNESSES
Wm. J. Littell,
A. Lee Lowe.
INVENTOR
Henry G. Lea,
by J. R. Littell,
Attorney

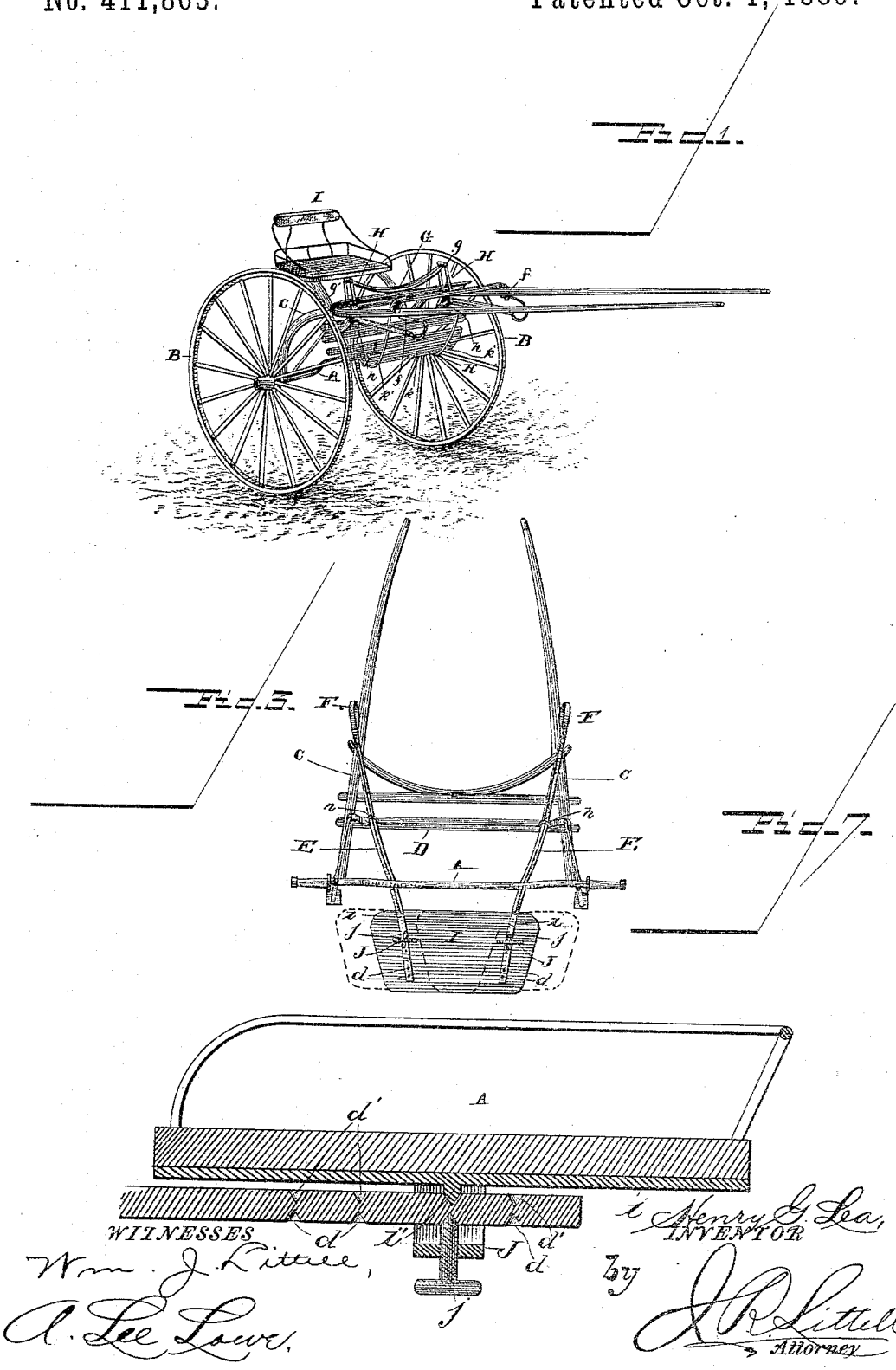

UNITED STATES PATENT OFFICE.

HENRY G. LEA, OF NEVADA, OHIO.

ROAD-CART.

SPECIFICATION forming part of Letters Patent No. 411,863, dated October 1, 1889.

Application filed May 6, 1889. Serial No. 309,731. (No model.)

*To all whom it may concern:*

Be it known that I, HENRY G. LEA, a citizen of the United States, residing at Nevada, in the county of Wyandot and State of Ohio, have invented certain new and useful Improvements in Road-Carts; and I do hereby declare that the following is a full, clear, and exact description of the invention, which will enable others skilled in the art to which it appertains to make and use the same.

This invention relates to road-carts; and its object is to provide a simple and improved vehicle of this class in which the seat is adapted to have lateral play, whereby the side jar incident to travel upon rough roads is entirely obviated.

A further object of the invention is to provide a cart of this character in which the seat is adjustable upon its supporting-bars to readily and quickly adapt the same to the weight of the occupant.

A further object of the invention is to provide a vehicle of this class possessing advantages in point of simplicity, inexpensiveness, durability, and general efficiency.

In the drawings, Figure 1 is a perspective view of a road-cart embodying my invention. Fig. 2 is a similar view taken from the rear, the carrying-wheels, seat, and crate being removed. Fig. 3 is a bottom or inverted plan view with the crate and wheels removed, the lateral motion of the seat being illustrated in dotted lines. Fig. 4 is a vertical sectional view taken longitudinally, the seat being removed. Fig. 5 is a similar detail view taken through the seat. Fig. 6 is a similar view taken at right angles thereto. Fig. 7 is an enlarged vertical sectional view on the line $x$ $x$, Fig. 6.

Corresponding parts in the figures are denoted by the same letters of reference.

Referring to the drawings, A designates the axle, B B the wheels mounted thereon, and C C the thills. The latter are curved downwardly at their rear ends and connected with the axle. In front of the turned-down end of the thills is provided a cross-bar D, connecting the same.

E E designate the seat-bars, preferably constructed of steel, and formed with downwardly-projecting U-shaped bends at about their centers, as shown at $c$ $c$. These bars converge rearwardly and are connected at their front ends with the thills by approximately U-shaped springs F F. The latter are rigidly bolted to the seat-bars, or they may be formed integral therewith, and are pivotally secured to the thills, as at $f f$, whereby lateral movement of the thills is permitted.

Upon the cross-bar D is mounted a leaf-spring G, secured centrally thereon and in the same plane therewith, the ends of said spring being curved upwardly and provided with transverse bearing-eyes $g$ $g$. Within the latter are pivoted downwardly-projecting elongated links H H, embracing the cross-bar D, and connected with the seat-bars by links or rings $h$ $h$, encircling the same. It will thus be obvious that free vertical and lateral play of the seat-bars is permitted, and by reason of the rigid connection of said bars and the springs F, and the pivotal connection between the latter and the thills, the said springs readily turn with the seat-bars during the lateral movement thereof.

I designates the seat, which may be of any suitable construction, and is preferably provided upon its under side, near each end, with a transverse metallic strip $i$ $i$, having each a downwardly-projecting pivot-pin $i'$ $i'$. About midway of each strip and straddling the same is provided a staple J, forming a rectangular opening between the same and the strips. Through these openings slide the rear free ends of the seat-bars, each of the latter being provided with a series of top and bottom indentures or perforations $d$ $d$ and $d'$ $d'$, respectively adapted to be engaged by the pins $i'$ and by set-screws $j j$, provided through the staples. The openings through the staples are of sufficient size to permit play of the seat-bars during the lateral movement thereof. From the seat-bars is suspended the rear end of a crate K, the slats $k$ of which being pivoted to the suspending-bars $k'$ $k'$, whereby said slats adapt themselves to the lateral motion imparted to the crate from the seat-bars.

The operation and advantages of my invention will be readily understood by those skilled in the art to which it appertains. In use, the motion of the horse is taken up by the springs F, while the side jar incident to rough roads or obstructions is effectually overcome by the lateral motion or yielding of the seat without detracting from the perfect spring action of the seat.

The adjustment of the seat will be obvious. For light weight it is moved to the rear ends of the seat-bars or farther from the fulcrum of the same, while as the weight is increased it is moved toward the front ends of the bars or nearer to the fulcrum, and when adjusted retained in such position by the means described.

I claim as my invention—

1. In a road-cart, the combination, with the thills and cross-bar connecting the same, of the seat-bars having laterally-movable connections with the thills, an inverted curved spring mounted on the cross-bar, and links connecting said spring with the seat-bar and embracing the cross-bar, whereby longitudinal movement of the seat is obviated, substantially as set forth.

2. In a road-cart, the combination, with the seat-bars provided with a corresponding top and bottom series of indentures, of an adjustable seat provided with staples embracing said bars and with studs or pins adapted to be received by said top perforations and form pivotal bearings for the seat, and set-screws for engaging the said bottom perforations to retain the seat in adjusted position, substantially as and for the purpose set forth.

3. In a road-cart, the combination, with the thills and a cross-bar connecting the same, of seat-bars having a pivotal spring connection with the thills, substantially as described, and carrying a seat, and an inverted curved spring mounted on the cross-bar and connected with the seat-bars by laterally-movable elongated links embracing said cross-bar, substantially as set forth.

4. In a road-cart, the combination of the thills, seat-bars connected therewith by approximately U-shaped springs, said springs being rigidly secured to said bars and pivotally secured to the thills in the manner set forth, an inverted curved spring mounted on a cross-bar and in a plane therewith and provided with bearing-eyes at its ends, laterally-movable elongated links bearing in said eyes and embracing the cross-bar, links or rings encircling the seat-bars and connected with said elongated links, and a seat adjustably mounted on the seat-bars, substantially as set forth.

In testimony whereof I affix my signature in presence of two witnesses.

HENRY G. LEA.

Witnesses:
W. H. COOK,
JAMES B. JOHNSON.